Nov. 26, 1963 B. F. WAGNER 3,112,471

VOLTAGE CONTROLLED MAGNETIC SYSTEM

Filed May 6, 1959

INVENTOR:
BURTON F. WAGNER,

T. E. Kristofferson

HIS ATTORNEY.

United States Patent Office 3,112,471
Patented Nov. 26, 1963

3,112,471

VOLTAGE CONTROLLED MAGNETIC SYSTEM

Burton F. Wagner, Auburn, N.Y., assignor to General Electric Company, a corporation of New York Filed May 6, 1959, Ser. No. 811,398
3 Claims. (Cl. 340—174)

Figure 1:
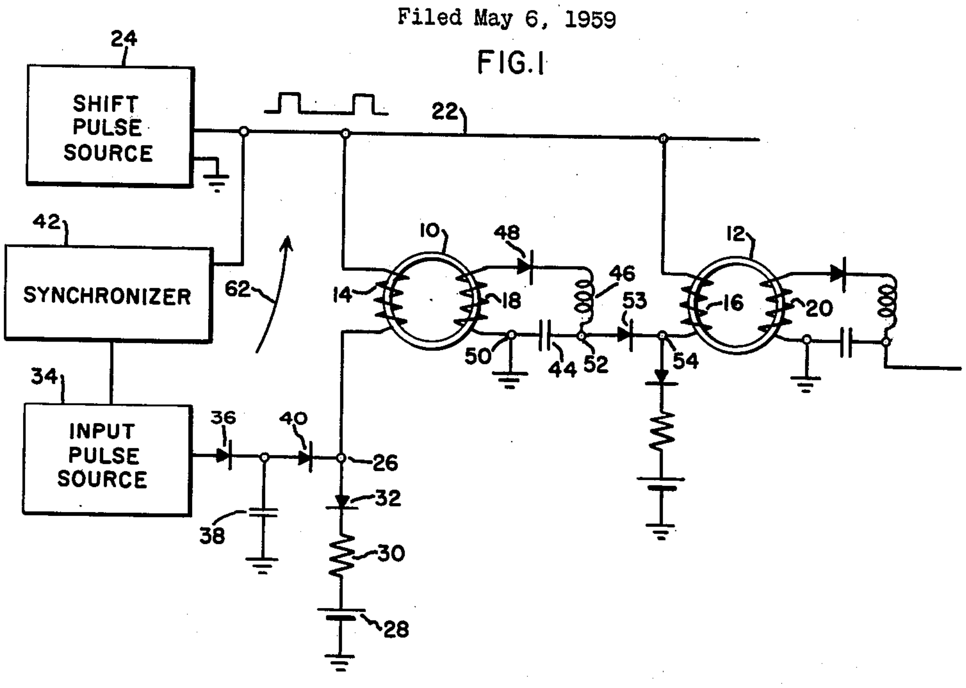

This invention relates to magnetic systems capable of representing binary information by the residual flux density of magnetic elements therein and, more particularly, to such systems useful as shift registers.

Shift registers driven by current pulses are known to the art. The difficulty of designing efficient, compact current pulse sources coupled with the difficulty of accurately controlling their waveform when passing through a saturable core element has resulted in limiting the application of magnetic core shift register circuitry primarily to low and moderate frequency information handling equipment.

A voltage controlled shift register obviating many of the difficulties of current controlled shift registers is disclosed in an application for Letters Patent entitled, Voltage Driven Magnetic Core System, SN 795,811, filed Feb. 26, 1959 by J. R. Horsch, which application is assigned to the same assignee as is the instant application. In the referenced application there is disclosed a shift register employing sequentially applied positive and negative voltage pulses operating in combination with an input pulse to drive the magnetic elements around an accurately controlled partial hysteresis loop, that is a magnetic path having an excursion less than the path associated with saturation flux density.

The present application is directed toward an improved voltage controlled shift register circuit employing a single shift pulse for register operation.

It is one object of my invention to provide a shift register having one core per bit, each of said cores having only two windings, and in which each information transfer through said register is actuated by a single voltage pulse.

It is another object of my invention to provide a shift register having improved signal to noise ratio.

It is a further object of my invention to improve shift register power efficiency by full utilization of stored information energy.

It is a further object of my invention to provide a shift register having stable operation over extreme variations of shift pulse duration.

It is a further object of my invention to provide a shift register circuit immune to small variations in the shift pulse source.

In accordance with these objects I have provided a shift register having a plurality of magnetic cores, each of which is adapted to represent the two possible states of binary coded bit by two distinct reference levels of flux density therein. A shift voltage pulse of predetermined amplitude and duration is periodically applied to the cores to set the cores to a retentive flux density in one direction.

One state of a binary bit, represented by an input pulse of predetermined amplitude, will change the flux density in one of the cores from the retentive flux density level established by the shift pulse. Tht other state of a binary bit, represented by an input pulse of zero amplitude, will not change the flux density from the retentive flux density level. Thus the state of the binary bit is stored in the form of a distinct flux density level in the said one of said cores.

Change of digit position of the stored bit information is made during the application of the shift pulse by providing an intermediate storage network coupled across a secondary winding on the core. Charge is applied to the storage network only if the shift pulse changes the flux density within a magnetic element, and this charge is applied to change the flux density in a subsequent core after the termination of a shift pulse.

Other objects and advantages of my invention will become apparent upon reference to the accompanying specification and drawings.

Figure 2:
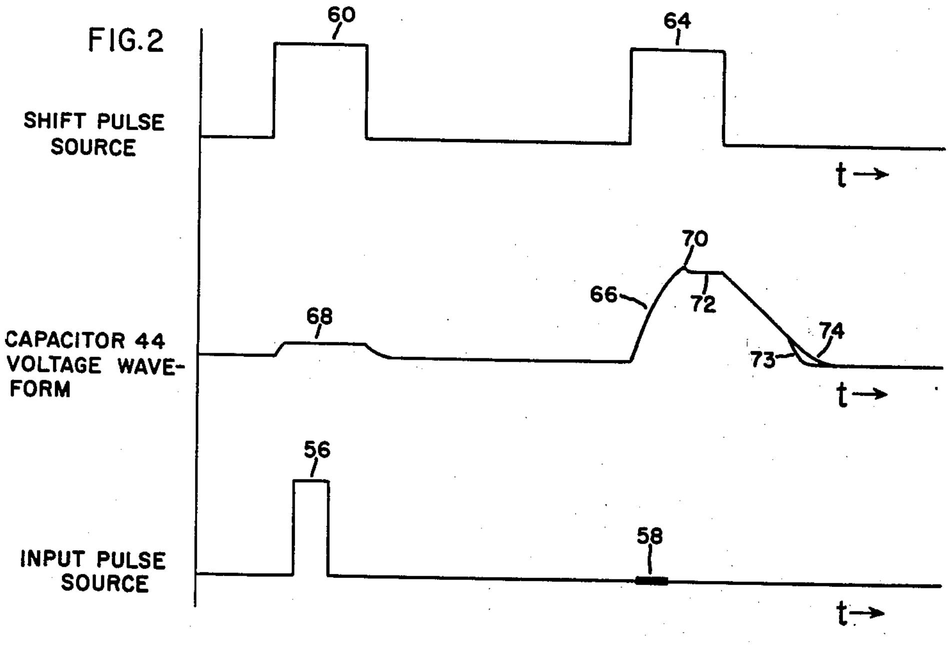

A preferred embodiment is illustrated in the accompanying drawing, in which:

FIGURE 1 is a schematic diagram of a shift register in accordance with this invention; and FIGURE 2 is a plot of voltage waveforms at various points of the circuit of FIGURE 1 to a common time base in which voltage is plotted along the axis of ordinates and time is plotted along the axis of abscissa.

In FIGURE 1 there is shown a shift register having cores 10 and 12 with respective primary windings 14 and 16 and respective secondary windings 18 and 20 wound thereon. Only two cores are shown for simplicity, but any number may be employed to handle the requisite number of bits in the binary-coded message. The cores may be made from any magnetic material having a substantially rectangular hysteresis loop but are preferably made of magnetic tape wound into a toroidal core. In some applications ferrites may be employed, but in most applications the desired limitation of magnetic flux handled by each core would make the physical size of a ferrite core impractical to construct.

One terminal of each primary winding is connected to a shift bus 22 over which shift pulse signals from source 24 are applied. The other terminal 26 of primary winding 14 is coupled to ground through the serially connected combination of a bias source 28, a resistor 30 and a unidirectional conducting device 3. The input bit information generated in source 34 is applied through a unidirectional conducting device such as diode 36 to the intermediate storage element capacitor 38. The stored information on capacitor 38 is coupled to the terminal 26 of the primary winding through a unidirectional conducting device such as diode 40. A synchronizer circuit 42 couples the shift pulse source with the input pulse source to synchronize the generation of pulses.

An output and storage circuit is provided to transfer information to successive digit positions in the shift register. This circuit comprises the serially connected capacitor 44, inductor 46, and unidirectional conducting device such as diode 48. One terminal 50 of the capacitor 44 is tied to ground and the other terminal 52 is connected through a diode 53 to terminal 54 of the primary winding 16 of the second core 12. Thus, the capacitor 44 serves as the intermediate storage element of core 12, with the same operating functions as capacitor 38 associated with core 10.

OPERATION

The operation of the circuit is best explained by reference to FIGURES 1 and 2 simultaneously. In FIGURE 2 there are shown waveforms of signals developed in the circuit of FIGURE 1 plotted to a common time scale. There is also a typical input pulse signal from the input pulse source 34 in which a pulse 56 indicates the binary bit state "1" and the absence of a pulse indicated by darkened line 58 indicates the binary state "0".

The bit states are to be represented by magnetic core flux levels. The "0" state is represented by a retentive core flux which is the residual core flux remaining after application and removal of coercive force sufficient to establish saturation flux desity in the core. The "1" state may be represented by any other residual state of the core determined by the amplitude and duration of the information pulses; such as a retentive flux in direction opposite to that of the retentive flux representing the zero state.

Simultaneously with the application of the pulse 56 to the storage capacitor 38, a shift pulse 60 is applied to all primary windings through bus 22. Storage of the information pulse on capacitor 38 is ensured through the co-action of the diode 40 and the shift pulse 60 (FIGURE 2) which raises terminal 26 of the primary winding 14 to a higher positive potential than the potential applied by source 34.

The shift pulse will establish a current in the primary winding by overcoming the bias 28. This current is sufficient to set core 10 to the retentive level. At the termination of the shift pulse 60 the charge stored on capacitor 38 will flow through the primary winding 14 in the direction indicated by arrow 62. Diode 36 will ensure that substantially all the charge from capacitor 38 will flow in the direction of arrow 62. The current indicated by arrow 62 caused by the input signal will set the core 10 to a residual value of flux different from the retentive level associated with the "0" state. If the charge is sufficient, the core will be set to a retentive flux density in the direction opposite to that associated with the "0" state, commonly termined switching the core.

The subsequent shift pulse 64 will again switch the core flux density to its retentive level. The change of core flux will generate a voltage across secondary winding 18. This voltage will cause a charge to be stored on capacitor 44, discharge of which is prevented by operation of the diode 48. Diode 53 prevents charging of capacitor 44 from the shift pulse applied to the following core 12 over bus 22. The resulting waveform on capacitor 44 is shown as 66 in FIGURE 2. The voltage rises to a peak 70 and then drops slightly because of discharge of the capacitor through the secondary winding before diode 48 has recovered. After the reverse recovery time of diode 48, the capacitor voltage is constant as illustrated at 72, since the diode 48 now prevents discharge of the capacitor.

The capacitor 44 is an intermediate storage element serving the same function as capacitor 38 in changing the core flux of an associated core. After the termination of the shift pulse, the capacitor 44 will discharge through the primary winding 16 of core 12. The current flow serves to set core 12 to transfer thereto the bit state information previously stored in core 10. If the current flow is sufficient to saturate core 12, the voltage will suddenly drop off as indicated by line 73. If core 12 is only "partially looped," the voltage will decay to zero, indicated by line 74. Thus, the information bit can be shifted to various digit positions in the register.

The flux density in core 10 established by the shift pulse is not changed since the input bit state 58 is insufficient to overcome the bias 28 and cause current flow through the primary winding.

In this manner the bits "1" and "0" are represented respectively by the flux states in the cores 12 and 10. Shifting of the information to other digit positions is accomplished in similar fashion.

Since the magnetic characteristics of core materials differ from the idealized rectangular hysteresis loop, a small output voltage will be generated across the secondary winding when the shift pulse is applied even though retentive flux density in the same direction is present in the core. A typical output voltage is shown as waveform 68 which represents the voltage appearing across capacitor 44 during the first shift pulse 60, assuming that the register was initially cleared. The inductor 46 serves to greatly attenuate these spurious signal spikes without interfering with the charging of the capacitor by a proper output voltage which is of longer duration.

The shift pulse source for a register of 12 to 15 elements may be easily constructed of low power transistors under all anticipated operating frequencies. Oscillators and amplifiers for voltage pulse generation can be operated at a low power level, and, thus, the power dissipation may be handled even with miniature packaging. In contrast the current sources required to drive shift registers presently available would require power transistors operating with a heat sink, preclude efficient packaging, and increase operating expense.

An example of the electrical characteristics of a shift register for operation over the frequency range of 0 to 600,000 shifts/second is given in Table I. This table is exemplary only and my invention is not intended to be limited in any way thereto.

*Table I*

| | | |
|---|---|---|
| A. Shift pulse (60 and 64) | | |
| 1. Maximum shift rate | kc./s | 600 |
| 2. Nominal amplitude | volts | 20 |
| 3. Minimum amplitude | volts | 17 |
| 4. Maximum amplitude | volts | 30 |
| 5. Nominal width (50%) | μsec | 0.6 |
| 6. Minimum width (50%) | μsec | 0.4 |
| 7. Nominal peak current | ma | 70 |
| 8. Peak pulse power | watts | 1.4 |
| B. Bias potential (28): 5 volts | | |
| C. Interstage signal (66 and 68) | | |
| 1. Nominal peak "one" | volts | 5 |
| 2. Nominal rise time | μsec | 0.27 |
| 3. Nominal fall time | μsec | 0.85 |
| 4. Minimum 1/0 ratio | | 10 |

D. Component values
1. Core (10 and 12)
   a. Stainless steel bobbin:
      I.D.=0.098 inch.
      O.D.=0.164 inch.
      Groove diameter=0.110 inch.
      Groove width=$\frac{1}{32}$ inch.
      Height=0.060 inch.
   b. Magnetic material:
      $\frac{1}{8}$ mil 4–79 Mo-Permalloy
      "one" flux=3.5 maxwells
2. Primary winding (14 and 16): 45 turns
3. Secondary winding (18 and 20): 35 turns
4. Capacitor (38 and 44): 1800 μμf.
5. Resistor (30): 200 ohms
6. Inductor (46): 30 μhenry
7. Diode (40, 36 and 53): Hughes HD2166
8. Diode (48): Hughes 1N270
9. Diode (32): Transitron 1N270

The shift register embodying my invention is adaptable to variation of both the shift and the input pulse potential and duration. A considerable safety factor is provided by the circuit itself, since the shift register can operate under partial looping of the cores. For example, if the amplitude of the input pulses indicating the "1" state fell below that required to completely switch the core 10, the core flux indicating the "1" bit state would merely be a remnant flux density different from the retentive level defined as the "0" state and operation would be unchanged. Under such circumstances all remaining cores in the register may similarly operate over a partial loop.

Although it is usually convenient to employ the intermediate storage capacitor 38 because of the ease of synchronizing the positive pulse with the shift pulse source, the input signal may be applied directly to the primary winding or to an auxiliary winding between the shift pulses.

It will be obvious to those skilled in the art that potential polarity and reference potential amplitude, as well as other design considerations, may be changed at various points in the circuit without changing the essence of circuit operations. It is therefore intended by the following claims to cover all such variations as may occur within the true spirit and scope of my invention.

What is claimed is:

1. In a shift register comprising a plurality of cascaded magnetic core stages, first and second magnetic cores made of a material capable of being driven from a retentive flux density in a first direction to a retentive flux density in a second direction, a primary and a secondary winding wound on each of said cores, a source of unipotential shift pulses connected to establish parallel current flow in a first direction through the primary windings of said first and second cores, charge storage means coupled in a unidirectional charging circuit across the secondary winding of said first core, rectifying means, means to discharge said charge storage means through said rectifying means to cause current flow in a second direction through the primary of said second core, biasing means connected serially with said shift pulse source and the primary winding of said second core to reverse bias said rectifying means to a predetermined voltage amplitude.

2. A shift register comprising a source of shift pulses and a number of cascaded stages, each stage comprising: a magnetic core providing a closed magnetic path; a primary and a secondary winding wound on said core; said source of shift pulses being connected between one side of said primary winding and a common point; an impedance, a source of bias potential and a first diode connected in series between said common point and the other side of said primary winding, said first diode poled to pass said shift pulses; a second diode connected to the said other side of said primary winding and pole so as to block said shift pulses; means connecting one side of said secondary winding to a common point; means connecting the other side of said secondary winding through a diode, an inductor and a capacitor sequentially to said common point, one side of said capacitor being connected to said common point; an output terminal for said stage at the point on said capacitor remote from said common point; means connecting the output terminal of each of said stages to the side of said second diode of the succeeding stage remote from said primary winding.

3. A shift register comprising a source of shift pulses, a source of input pulses and a number of cascaded stages, each stage comprising: a magnetic core providing a closed magnetic path; a primary and a secondary winding wound on said core; said source of shift pulses being connected between one side of said primary winding and a common point; an impedance, a source of bias potential and a first diode connected in series between said common point and the other side of said primary winding, said first diode poled to pass said shift pulses; a second diode connected to the said other side of said primary winding and poled so as to block said shift pulses; means connecting one side of said secondary winding to a common point; means connecting the other side of said secondary winding through a diode, an inductor and a capacitor sequentially to said common point; one side of said capacitor being connected to said common point; an output terminal for said stage at the point on said capacitor remote from said common point; means connecting the output terminal of each of said stages to the side of said second diode of the succeeding stage remote from said primary winding; means including a capacitor for storing said input pulses connecting said source of input pulses to the side of the second diode in the first stage remote from said primary; said input pulses and said shift pulses having the same polarity; means for synchronizing application of said shift and input pulses so as to apply them simultaneously for setting said core of each stage to a retentive flux density and preventing discharge of said capacitor of each of said stages until the termination of said shift pulse.

References Cited in the file of this patent

UNITED STATES PATENTS

| | | |
|---|---|---|
| 2,778,006 | Guterman | Jan. 15, 1957 |
| 2,846,669 | McMillan | Aug. 5, 1958 |
| 2,872,663 | Kelner | Feb. 3, 1959 |
| 2,892,998 | Eckert, et al. | June 30, 1959 |
| 2,932,815 | Cabaniss | Apr. 12, 1960 |
| 2,959,770 | Eckert | Nov. 8, 1960 |